(12) United States Patent
Brenner et al.

(10) Patent No.: US 11,709,740 B2
(45) Date of Patent: Jul. 25, 2023

(54) AUTOMATICALLY DETERMINING OPTIMAL STORAGE MEDIUM BASED ON SOURCE DATA CHARACTERISTICS

(71) Applicant: EMC IP Holding Company LLC, Hopkinton, MA (US)

(72) Inventors: Adam E. Brenner, Mission Viejo, CA (US); Arun Murti, Mission Viejo, CA (US); Mark D. Malamut, Aliso Viejo, CA (US); Joey C. Lei, Irvine, CA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 354 days.

(21) Appl. No.: 16/516,154

(22) Filed: Jul. 18, 2019

(65) Prior Publication Data

US 2021/0019233 A1 Jan. 21, 2021

(51) Int. Cl.
*G06F 11/14* (2006.01)
*G06F 3/06* (2006.01)

(52) U.S. Cl.
CPC .......... *G06F 11/1464* (2013.01); *G06F 3/067* (2013.01); *G06F 3/0619* (2013.01); *G06F 3/0643* (2013.01); *G06F 11/1453* (2013.01)

(58) Field of Classification Search
CPC ............. G06F 11/1464; G06F 11/1453; G06F 3/0619; G06F 3/0643; G06F 3/067
See application file for complete search history.

(56) References Cited

U.S. PATENT DOCUMENTS

| | | | |
|---|---|---|---|
| 2005/0060356 A1* | 3/2005 | Saika ................. | G06F 11/1464 714/E11.12 |
| 2005/0169172 A1* | 8/2005 | Wang ................. | H04L 47/2408 370/229 |
| 2008/0235299 A1* | 9/2008 | Haselton ............ | G06F 11/1451 |
| 2008/0275928 A1* | 11/2008 | Shuster .............. | G06F 11/1076 |
| 2009/0112878 A1* | 4/2009 | Denny ............... | G06F 11/0772 |
| 2009/0132543 A1* | 5/2009 | Chatley .............. | G06F 16/185 |
| 2010/0070475 A1* | 3/2010 | Chen .................. | G06F 11/1461 711/E12.001 |
| 2013/0091458 A1* | 4/2013 | Kang ................. | G06F 3/04883 707/737 |
| 2018/0121297 A1* | 5/2018 | Swallow ............ | G06F 11/1464 |
| 2019/0045004 A1* | 2/2019 | Khurange ......... | G06F 3/0607 |
| 2020/0019311 A1* | 1/2020 | Zolotow ............ | G06F 3/0661 |

* cited by examiner

*Primary Examiner* — Alford W Kindred
*Assistant Examiner* — Tiffany Thuy Bui
(74) *Attorney, Agent, or Firm* — Workman Nydegger

(57) ABSTRACT

One example method includes receiving a group of files, two or more of the files being of different respective file types, creating a backup saveset that includes the group of files, classifying each of the files in the backup saveset based in part on the respective file types of the files, assigning a respective storage media type to each of the classified files in the backup saveset, and transmitting the backup saveset to a storage site.

18 Claims, 5 Drawing Sheets

AUTOMATICALLY DETERMINING OPTIMAL STORAGE MEDIUM BASED ON SOURCE DATA CHARACTERISTICS

FIELD OF THE INVENTION

Embodiments of the present invention generally relate to data backup and restore processes. More particularly, at least some embodiments of the invention relate to systems, hardware, software, computer-readable media, and methods for determining optimal storage media for source data based on characteristics of that source data.

BACKGROUND

Typical backup software does not have the intelligence to automatically classify the types of files in a backup and then assign the correct storage medium to use for storage of those files. In order to do this, a user or customer would have to know what type of data they have in their entire environment, how many copies of each file exist, have deep technical understanding of the each storage medium and, lastly, be vigilant in sorting and classifying their data as it grows over time. Even if the customer knows all this, backup software limits what storage to use on an entire asset basis, rather than on a per file basis. Moreover, and as a practical matter, sorting and classifying data cannot practically or effectively be performed by a human at least because the amount of data involved, and the speed with which it would have to be classified, is simply beyond the capability of a human to handle.

BRIEF DESCRIPTION OF THE DRAWINGS

In order to describe the manner in which at least some of the advantages and features of the invention can be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Figure 1:
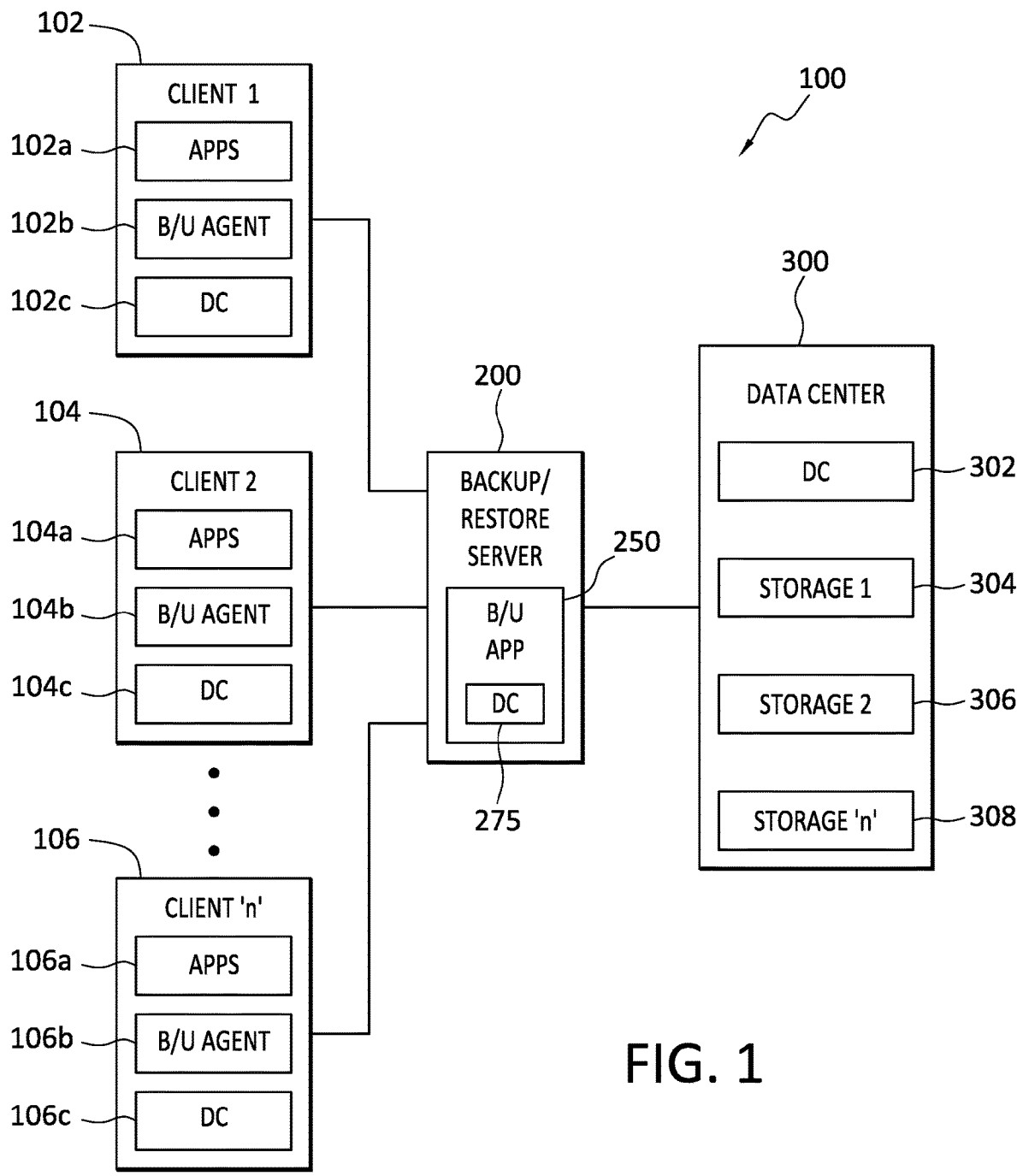
FIG. 1 discloses aspects of an example operating environment for some embodiments of the invention.

Embodiments of the present invention generally relate to data backup and restore processes. More particularly, at least some embodiments of the invention relate to systems, hardware, software, computer-readable media, and methods for determining optimal storage media for source data based on characteristics of that source data.

In general, example embodiments of the invention operate to, among other things, classify what types of files are being backed up and assign the most efficient storage medium to store those files for data protection use cases. Deduplication, or 'dedupe,' storage targets can be the most cost effective when data is able to be deduplicated relatively efficiently. Examples of such data include, but are not limited to, business documents such as Word and Excel documents, text files, and virtual machine disks (VMDK). On the other hand, because dedupe storage is relatively expensive, non-compressible types of files, such as movies, images, or files that have already been compressed, are more cost effectively stored on less expensive non-dedupe storage, such as object or tape for example, unless there happen to be many copies of the same file or files that contain a high degree of common data.

In more detail then, an underlying concept of at least some embodiments of the invention is that machines are best suited to perform the high speed, and high volume, work of classifying files and determining what customer data should be stored on a specific storage medium, examples of which include dedupe storage such as the Dell-EMC DataDomain, object storage, or tape drives. These processes can be performed inline as the data is being backed up. As noted earlier, the amount of data companies have makes classifying and choosing the correct storage medium for each file an untenable process for a human but an extremely easy process for machines. While the present disclosure refers to three different storage mediums, embodiments of the invention can be extended beyond those three and to versions of the media with different characteristics. That is, the scope of the invention is not limited to any particular storage types, or groups of storage types.

Embodiments of the invention can be employed in conjunction with backup software that is capable of storing individual files within a single backup on different storage mediums even though, as noted herein, such backup software is not presently capable of determining, on a file basis, which storage should be used for each of the individual files. Instead, known backup software using different storage mediums requires using separate backups for the same asset. That is, it is common for a specific asset, such as a backup or saveset, to have some data that dedupes and compresses efficiently, as well as data that does not dedupe and compress efficiently. For example, an end-user desktop may have both pictures and movies that do not dedupe efficiently, but may also have business documents that do dedupe efficiently. In this example then, two backup processes would have to be performed, one for the data that dedupes and compresses efficiently, and another backup process for the data that does not dedupe efficiently.

Advantageously then, example embodiments of the invention can, among other things, automatically classify each file that is part of a backup, and then assign the appropriate storage medium, such as dedupe, object or tape for example, for each file. By assigning storage types on a file basis, example embodiments employ dedupe storage only when necessary, thereby reducing customer costs, and can also help to meet customer service level agreements (SLA)s for their data protection use cases. Embodiments of the invention also thus avoid the need for performing multiple backup processes with respect to a given backup or saveset. That is, a single backup process can be performed that automatically classifies and stores all the data in the saveset, notwithstanding that the saveset includes some data which compresses and dedupes efficiently, and other data that does not.

A. Aspects of an Example Architecture and IoT Environment

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, data generation, data processing, and data management, operations. Such data management operations may include, but are not limited to, data read/write/delete operations, data deduplication operations, data backup operations, data restore operations, data cloning operations, data archiving operations, and disaster recovery operations. More generally, the scope of the invention embraces any operating environment in which the disclosed concepts may be useful.

At least some embodiments of the invention provide for the implementation of the disclosed functionality in existing backup platforms, examples of which include the Dell-EMC NetWorker and Avamar platforms and associated backup software, and storage environments such as the Dell-EMC DataDomain storage environment. In general however, the scope of the invention is not limited to any particular data backup platform or data storage environment.

New and/or modified data collected and/or generated in connection with some embodiments, can be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment. Where a backup comprises groups of data with different respective characteristics, that data can be allocated, and stored, to different respective targets in the storage environment, where the targets each correspond to a data group having one or more particular characteristics.

Example public cloud storage environments in connection with which embodiments of the invention can be employed include, but are not limited to, Microsoft Azure, Amazon AWS, and Google Cloud. More generally however, the scope of the invention is not limited to employment of any particular type or implementation of cloud storage.

In addition to the storage environment, the operating environment may also include one or more clients that are capable of collecting, modifying, and creating, data. As such, a particular client may employ, or otherwise be associated with, one or more instances of each of one or more applications that perform such operations with respect to data.

Devices in the operating environment can take the form of software, physical machines, or virtual machines (VM), or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, can likewise take the form of software, physical machines or virtual machines (VM), though no particular component implementation is required for any embodiment. Where VMs are employed, a hypervisor or other virtual machine monitor (VMM) can be employed to create and control the VMs.

As used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

With particular attention now to FIG. 1, one example of an operating environment for embodiments of the invention is denoted generally at 100. In general, the operating environment 100 may include any number 'n' of clients such as clients 102, 104, and 106 for example. Each of the clients 102, 104, and 106 may have a respective set of applications 102a, 104a, and 106a, that can generate new and/or modified data that is later backed up. To that end, the clients 102, 104, and 106 may each include a respective instance of a backup and restore agent 102b, 104b, and 106b. Finally, in some embodiments, the clients 102, 104, and 106 may each include a respective instance of a Data Classifier (DC) 102c, 104c, and 106c. As explained below, one or more instances of a DC may be hosted at other entities.

With continued reference to FIG. 1, the example operating environment 100 may further include one or more backup and restore servers, such as the backup and restore server 200. The example backup and restore server 200 may include an instance of a backup and restore application 250 that cooperates with one or more of the backup and restore agents 102b, 104b, and 106b to create backups of data generated by the client applications 102a, 104a, and 106a. As well, the backup and restore server 200 may also include an instance of a data classifier (DC) 275. In general, and as disclosed elsewhere herein, the DC 275 operates to classify backup data based, for example, on file type and/or other characteristics, so that the various types of backup data are stored in, and restorable from, appropriate respective storage media types and devices.

As further indicated in FIG. 1, the example operating environment 100 may also include a datacenter 300 which can comprise, or include, a cloud storage site that may be a public or private site, or any other type of storage site disclosed herein. The datacenter 300 may, in some embodiments, include an instance of a DC 302. As well, the datacenter 300 may include various different types of storage media 304, 306, and 308, for example. Some example types of storage media 304, 306, and 308 that can be used in various embodiments include, but are not limited to, object storage such as Amazon Web Services (AWS) Simple Storage Service (S3), dedupe storage, and tape.

B. Aspects of an Example Data Classifier and Data Classification

Figure 2:
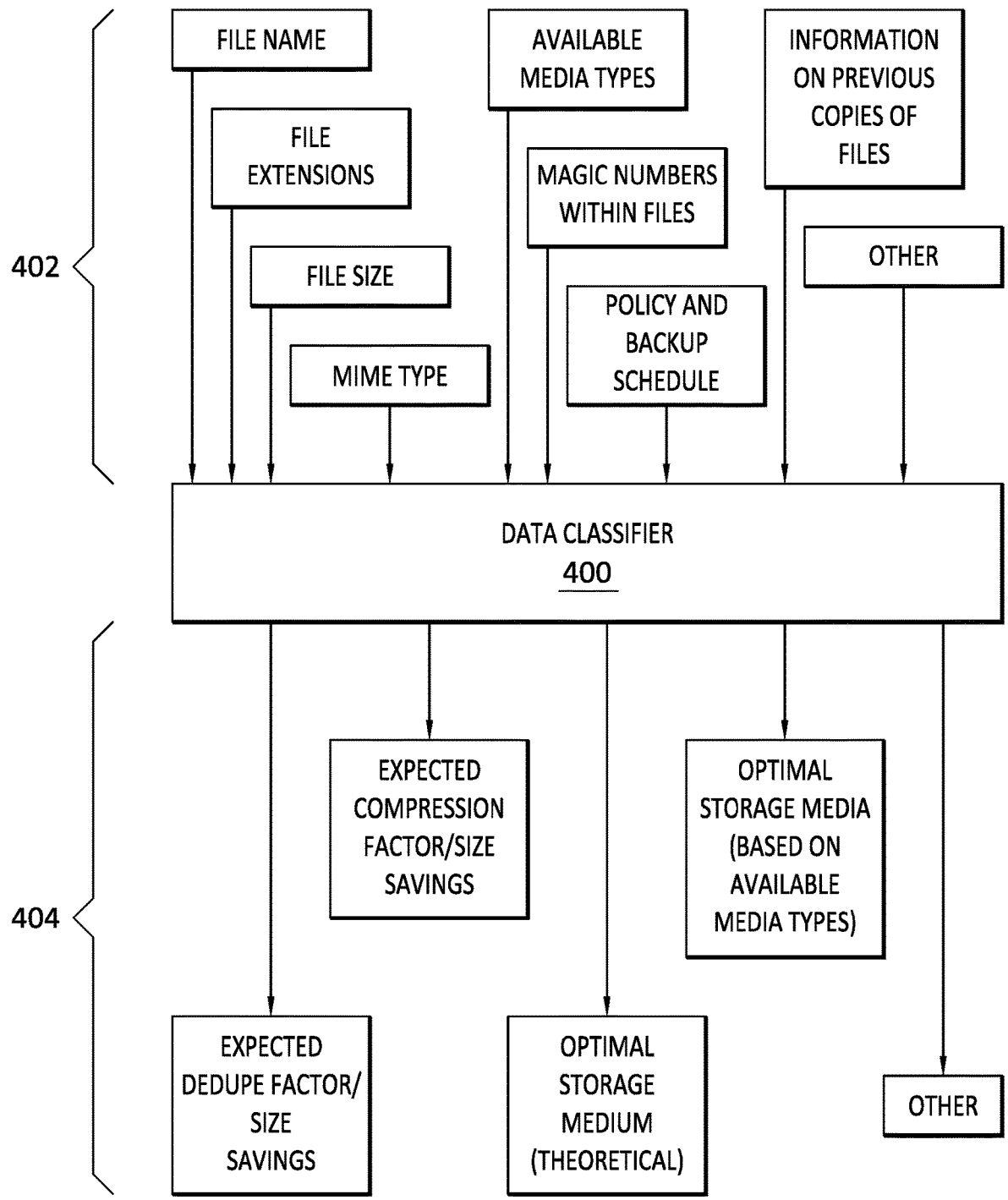
FIG. 2 discloses aspects of an example data classifier (DC).

With reference next to FIG. 2, details are provided regarding example embodiments of a data classifier (DC) and associated functionality. In general, and as disclosed elsewhere herein, the DC functionality can be implemented in a backup application or backup software, although that is not necessarily required, and the DC functionality can additionally, or alternatively, be implemented elsewhere, as noted in the discussion of FIG. 1.

In general, the DC can take into account multiple mediums across multiple storage environments across an entire customer infrastructure. The DC implements this functionality using automation, which is important for customers, as it obviates the need for the customer to attempt to classify and assign storage mediums on their own which, as noted elsewhere herein, is beyond the capability of a human to perform effectively and efficiently. Thus, embodiments of the invention may be effective in resolving problems that did not exist prior to the advent of backup and storage processes and systems.

Among other things, example embodiments of the DC are capable of classifying files in such a way that each file within a single backup may be stored to a different respective storage medium, and each storage medium may be of a different respective type. In some embodiments, the DC can take the form of a library/plugin, making it easily adaptable to work with hardware and software products. The DC can classify the files of a backup by, for example, examining the backup saveset before streaming and storage, or by classifying the files inline as they are streamed to a storage site such as the datacenter 300 for backup. In any case, the datacenter or other storage site can receive instructions from the DC indicating where, that is, in what type of storage, each file of a backup is to be stored.

As shown in FIG. 2, an example DC 400 can be provided with, or retrieve, a variety of information 402 that the DC 400 can use to make classification determinations and storage decisions. The information 402 can be pushed to, and/or pulled by, the DC 400 at any suitable time, such as before, or during, creation of a backup. To illustrate with an example, during backup time, the backup software, such as backup application 250 for example, can provide the DC 400 with any combination of the following information 402 that can be used by the DC as part of its intelligence: (1) file name; (2) file extensions; (3) file size; (4) magic numbers within a file; (5) multipurpose internet mail extension (MIME) type; (6) information on previous copies of the file; and, (7) policy (including SLA) and backup schedule. The MIME type refers to an internet standard that describes the contents of files based on their nature and format.

Using the information 402, the DC 400 may generate any of a variety of outputs 404 relating to determination of storage media for one or more files of a backup saveset. For example, and as shown in FIG. 2, the example outputs 404 generated by the DC 400 can include any one or more of expected compression factor/size savings, expected dedupe factor/size savings, optimal storage medium (theoretical), optimal storage media (based on available media types), and various other outputs concerning storage media for individual files. The foregoing are presented only by way of example, and are not intended to limit the scope of the invention in any way.

Thus, the information 402 and/or other information provided to the DC 400 may be used by the DC 400 to: (1) classify each file within a backup; and (2) assign or otherwise associate appropriate storage media to the backup. This mapping of media type(s) to the backup is then provided by the DC 400 to the backup software. It is then the responsibility of the backup software to assign and keep track, after the backup has been performed, of which file is located on which storage medium. This map of files to media type(s) can be stored locally at the backup server and/or elsewhere, and provided to other entities as well, such as one or more clients, and the datacenter where the files will be backed up.

To illustrate, the DC 400 might return, to the backup software, a value of "object storage" for a given file of the backup, and the backup software might interpret that value to mean, for example, AWS S3 Object Storage, or on-prem Dell-EMC Elastic Cloud Storage (ECS). The correlation between a value such as "object storage" and a particular storage medium such as AWS S3 Object Storage can be defined in advance by the DC 400 and/or other entity, or by an administrator. In some embodiments at least, the storage site can provide information to the DC 400 concerning the media type(s) available, or expected to be available, at the storage site at backup time, as well as information concerning the capacity of the available media type(s). The information provided by the storage site can be used by the DC 400 and backup software to identify storage media for the files in the backup.

In one example, if the DC 400 identifies a file with a file extension of .tar.gz that is unique to the entire operating environment 100, the DC 400 could make the recommendation to store that file on object or tape, rather than on dedupe storage. This recommendation would be made because .tar.gz compressed files do not gain much benefit on dedupe storage, that is, such compressed files are not amenable to signification deduplication, and so there would be little benefit in directing such files to dedupe storage, particular because dedupe storage tends to be more expensive for the consumer than, for example, non-dedupe storage such as Amazon S3 object storage. Moreover, storing compressed files on dedupe storage may cause an increase in storage and lower the overall efficiency of the entire storage system.

On the other hand, and with continued reference to the aforementioned example .tar.gz file, the DC 400 might also recognize that (i) this particular compressed file is duplicated across an entire environment of the customer, and (ii) each instance is the same. The DC 400 in this case would make a recommendation to store this file on dedupe storage and optionally remove any existing copies in non-dedupe storage while replacing their references to the copy now stored on dedupe storage. Thus, and in contrast with typical systems and software, the DC 400 implements a level of intelligence that enables customers to perform file evaluation and storage on a file by file basis for the entire customer environment.

Note that, as used herein, 'dedupe storage' refers to a storage location where data deduplication is enabled and may be performed. Depending upon the embodiment, deduplication can be performed inline as data is streamed to storage, by a dedupe server after the backup has been created, or by a backup server. The data can be deduplicated post-process, that is, after storage. As well, data deduplication and/or compression can be performed at the source such as a client for example, or the target where the data is stored, or to be stored.

In another, more complex, example scenario, the DC 400 may notice a movie file which, the DC 400 is aware, historically does not dedupe or compress well, and the DC 400 recommends to store that file, such as an .mpeg, .aiff, or .avi for example, on object storage in a public cloud provider. However due to SLA and cost requirements that were set by the customer, the DC 400 determines that if the customer had to do a restore of this movie file, the restore would be slow and expensive. The restore could be slow if performed over a wide area network (WAN), and may be expensive due to the outgoing bandwidth cost of the public cloud provider. Therefore, the DC 400 might recommend keeping a copy of the file in both dedupe storage and the object storage in the public cloud provider. After some period of time, the DC 400 could make a recommendation to remove the local copy on the dedupe storage. In this example, dedupe storage was chosen because it might be the only storage target available to meet the SLA for fast restores. Thus, while the relative expense of different types of storage can be an important consideration in identifying a target storage media type for a file, it is not necessarily the only consideration.

Yet another example of DC 400 operations concerns devices that include both flash and hard disk drives media. In this example, the customer might back up .VMDKs which dedupe and compress well, and the DC 400 might, accordingly, generate a recommendation of dedupe storage for the VMDKs. However, due to an SLA set by the customer for fast recovery times, the DC 400 instead might make a recommendation to store the latest backups on flash storage media, while also making a recommendation for older backups to be stored on the hard disk drives. Thus, some considerations may take priority over others when a media type is assigned to a file. These priority relationships can be reflected in a decision tree that can be used by the DC 400 in making media type assignments to files. In some embodiments, the DC 400 might be continuously running and making recommendations to the backup software.

The foregoing examples are not intended to limit the scope of the invention in any way and, rather, are presented to illustrate various disclosed concepts. A wide variety of other scenarios and examples will be readily apparent to one of ordinary skill in the art having the benefit of this disclosure and the knowledge generally available in the art.

With continued reference to FIG. 2, embodiments of the invention are not limited to the example information 402 that the DC 400 can use for its intelligence. Moreover, the DC 400 can, but need not be, implemented as a library/program that is integrated with backup and restore software. Instead, the DC 400 could take the form of a standalone service, implemented as software as a service (SaaS) for example, and hosted on a dedicated server, at a backup server, and/or at a datacenter. Thus, this service could be managed by Dell EMC in a Software-as-a-Service environment, and taking advantage of scalable computing resources which could be located at, and administered by, a cloud storage site. Additionally, where the DC 400 is implemented as a SaaS, further data points such as feedback from customers and cross-customer metadata comparisons can be used to improve the DC's recommendation of where data should be stored. Advanced technology such as machine learning based approaches may be used to provide recommendations using data inputs beyond the illustrative examples identified in FIG. 2.

C. Example Host and Server Configurations

Figure 3:
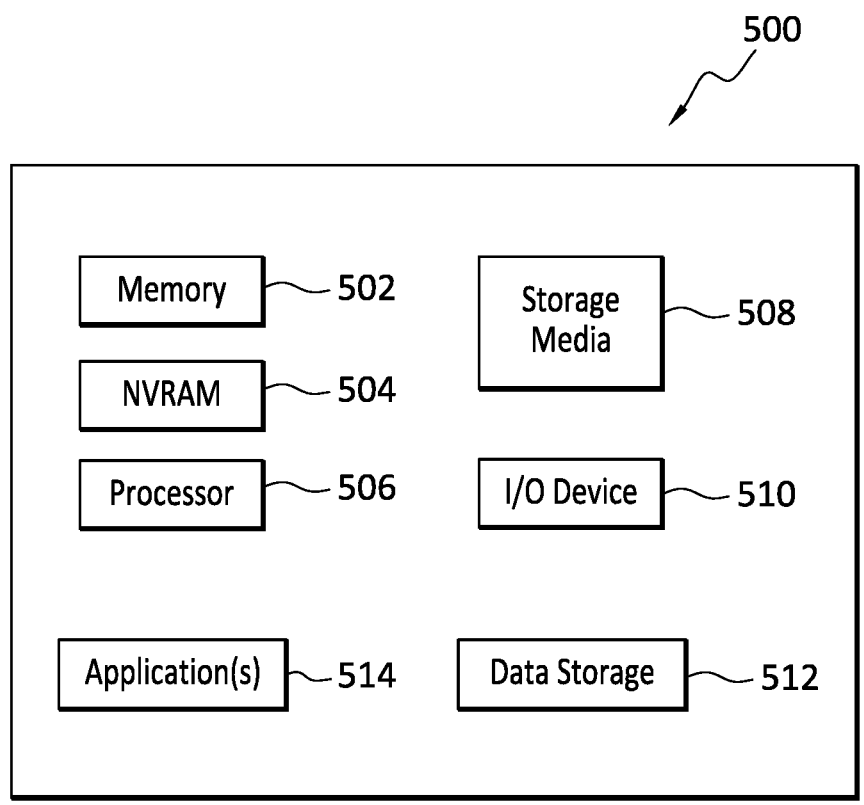
FIG. 3 discloses aspects of an example host configuration.

With reference briefly now to FIG. 3, any one or more of the clients 102, 104, 106, client applications 102*a*, 104*a*, 106*a*, backup and restore agents 102*b*, 104*b*, 106*b*, DC 102*c*, 104*c*, 106*c*, backup/restore server 200, backup application 250, DC 275, datacenter 300, DC 302, storage 302, 304, and 306, and DC 400, can take the form of, or include, or be implemented on, or hosted by, a physical computing device, one example of which is denoted at 500. As well, where any of the aforementioned elements comprise or consist of a virtual machine (VM), that VM may constitute a virtualization of any combination of the physical components disclosed in FIG. 3.

In the example of FIG. 3, the physical computing device 500 includes a memory 502 which can include one, some, or all, of random access memory (RAM), non-volatile random access memory (NVRAM) 504, read-only memory (ROM), and persistent memory, one or more hardware processors 506, non-transitory storage media 508, UI device 510, and data storage 512. One or more of the memory components 502 of the physical computing device 500 can take the form of solid state device (SSD) storage. As well, one or more applications 514 are provided that comprise executable instructions.

Such executable instructions can take various forms including, for example, instructions executable to perform any method or portion thereof disclosed herein, and/or executable by/at any of a storage site, whether on-premises at an enterprise, or a cloud storage site, client, datacenter, or backup server, to perform any of the functions disclosed herein. As well, such instructions may be executable to perform any of the other operations disclosed herein including, but not limited to, data collection, data processing including data analysis, data read/write/delete operations, instantiation of one or more applications, file classification, and assignment of appropriate storage media to one or more files of a backup.

D. Example Methods

Figure 4:
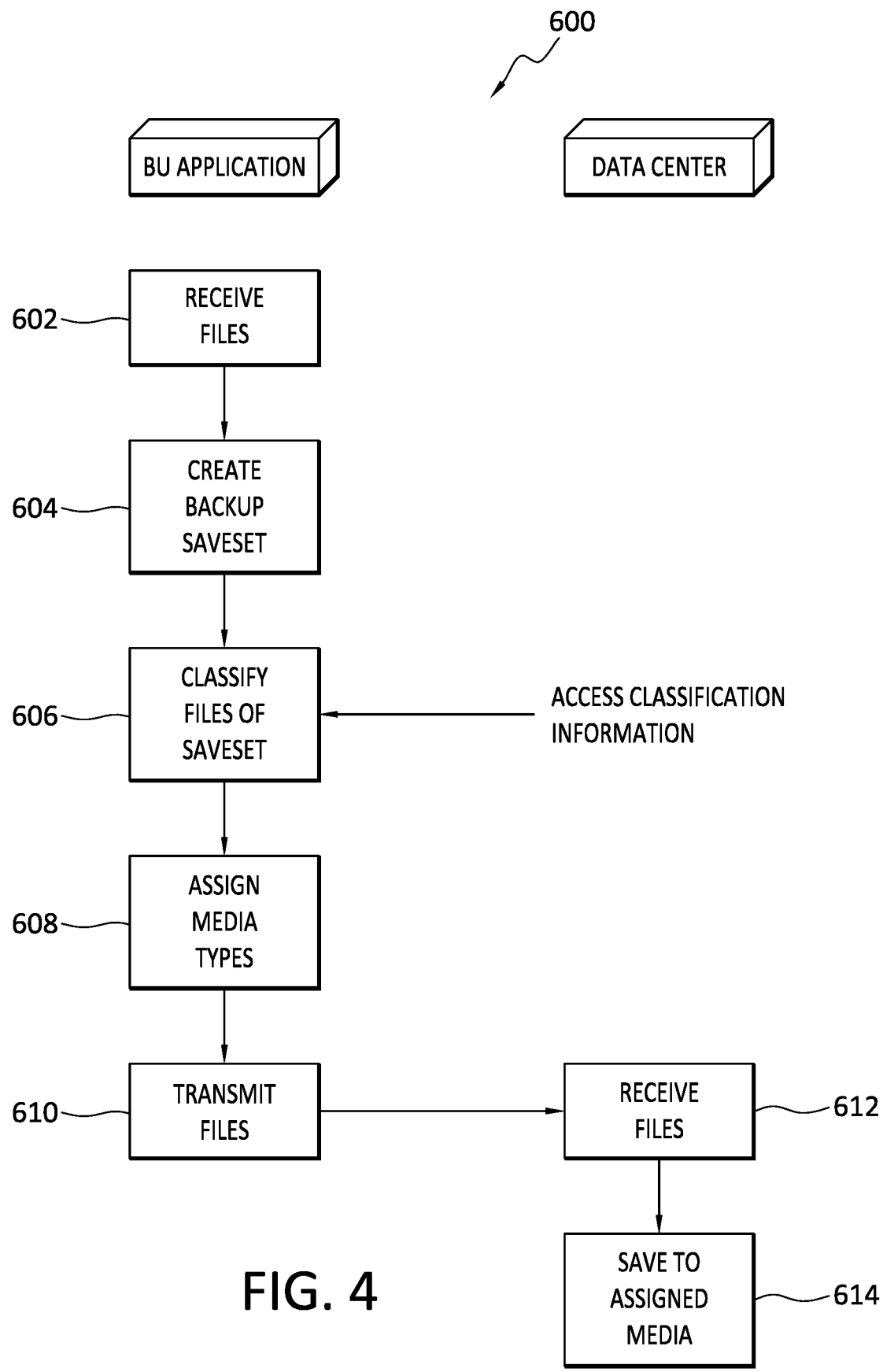
FIG. 4 discloses aspects of an example backup method.

Directing attention now to FIG. 4, aspects of methods for classifying data and assigning storage types based on the data classification are disclosed, where one particular example method is denoted generally at 600. In FIG. 4, various operations are indicated as being performed by particular entities, however, that functional allocation is provided only by way of example, and it should be understood that the functions disclosed herein can be allocated amongst various other entities in various other ways as well. As well, the example of FIG. 4 indicates various operations performed in an order. It should be understood from the present disclosure however, that the operations disclosed herein can be performed in a variety of different orders, and the particular arrangement of FIG. 4 is not limiting of the scope of the invention.

The method 600 can begin when an entity, such as a backup and restore server, receives 602 files for backup. The files may differ from each other in terms of their compressibility and/or dedupability. There is no limit to the types, numbers, or sizes of files that can be included in a backup saveset. In some embodiments, the files are received 602 from one or more clients, or other entities. After receipt 602 of the files, a backup saveset is then created 604 that includes the files. The backup saveset may be created 604 by cooperation between a backup and restore application of a backup and restore server and a backup and restore agent at a client whose files are, or will be, included in the backup.

Before, during, and/or after, receipt 602 of the files and creation of the backup saveset 604, one or more of the files of the backup saveset are classified 606. Classification 606 may be performed on any of a variety of different bases, one example of which is file type. That is, the classification of a file may simply correspond to the file type of that file. As disclosed herein, example file types include VMDK files, media files, office software files, and email files. As another example, the classification assigned 606 to any particular file may imply a relative compressibility and/or dedupability of that file. For example, a VMDK file may be highly compressible, while a .mpeg file may not be very compressible. In this example, the classification is based explicitly on file type, but also implicitly based on compressibility and dedupability since those characteristics often vary according to file type. As noted in the discussion of FIG. 2, a wide variety of inputs may be considered by the DC in classifying 606 files.

When the files of the backup saveset have been classified 606, a respective media type is assigned 608 to each of the classified files. Thus, the assigned media type(s) are a function of the classification of the file to which the media type(s) are assigned. For example, dedupe storage may be assigned to a VMDK, which dedupes and compresses well. Various other media types are disclosed elsewhere herein. In some embodiments, a primary media type and secondary media type can be assigned to the same file. The secondary media type may come into play when, for example, the primary media type is not available or lacks adequate capacity. In some embodiments, more than two media types can be assigned to a particular file. A map can be created that indicates each file and the media type assigned to that file. The map can be located, for example, at the backup server, and/or the datacenter.

With continued reference to FIG. 4, once the media type(s) have been assigned 608 to each of the files in the backup saveset, the files, and map if needed, are then transmitted 610 to a storage site, such as a datacenter, for storage. The files of the backup saveset are received 612 at the storage site and then stored 614 according to their respective assigned media type.

Thus, to continue with the VMDK example, a VMDK file in the saveset that has been assigned a dedupe storage media type will be deduped by, and stored in, dedupe storage media at the storage site. As another example, a media file in the saveset that has only limited dedupability and compressibility can be stored in object storage, which may be significantly less expensive, to the backup customer, than dedupe storage. In this way, embodiments of the invention implement a tailored storage approach that can improve cost effectiveness to the customer by only using more expensive storage when necessary, and/or the least expensive storage possible that still meets other customer requirements such as an SLA.

Figure 5:
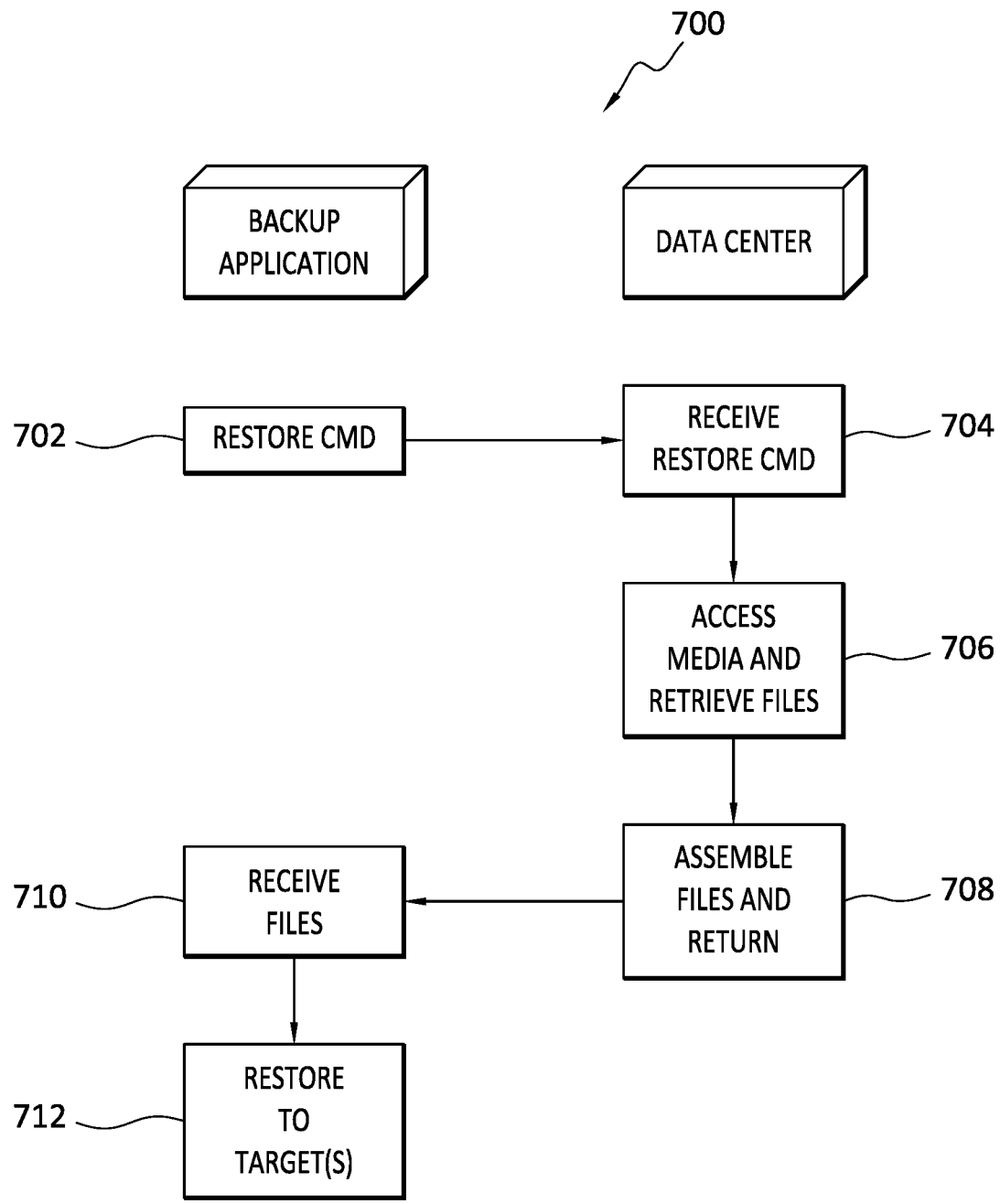
FIG. 5 discloses aspects of an example restore method.

Turning next to FIG. 5, details are provided concerning restore processes involving multiple different storage media, where one example process is denoted generally at 700. The method 700 can begin when a backup and restore application issues a restore command 702 to a storage site, such as a datacenter for example. In some embodiments at least, the restore command can be issued 702 in response to a client request that one or more files at the storage site be restored to the client and/or one or more other target entities. The restore command may identify the files desired to be restored, and may also identify the particular storage media, at the storage site, where each file is stored. Thus, the backup and restore application may track each individual file, and where that file is stored at the storage site, so that this information can be included in the restore request.

The restore request is received 704 at the storage site. The storage site then accesses 706 the various different storage media identified in the storage request, and retrieves, from each storage medium, the file(s) identified in the backup request as being stored in that particular storage medium. After the files have been retrieved 706, they may then be assembled together and returned 708 to the requestor, that is, the backup and restore application.

The backup and restore application receives 710 the files from the storage site, and then restores 712 the received files to the target entity, or entities, that were identified in the initial restore command 702.

Advantageously, the backup 600 and restore 700 processes may appear, to the user or customer, to be the same as or similar to conventional processes, in that nothing more is required of the user except to specify the files that are to be backed up, or restored, as applicable. That is, the user is neither required to classify the files of the backup, nor to assign storage media to the classified files. Thus, the useful classification and assignment functionality disclosed herein can be implemented without imposing any corresponding burden on the user.

E. Further Example Embodiments

Following are some further example embodiments of the invention. These are presented only by way of example and are not intended to limit the scope of the invention in any way.

Embodiment 1. A method, comprising: receiving a plurality of files, two or more of the files being of different respective file types; creating a backup saveset that includes the plurality of files; classifying each of the files in the backup saveset based in part on the respective file types of the files; assigning a respective storage media type to each of the classified files in the backup saveset; and transmitting the backup saveset to a storage site.

Embodiment 2. The method as recited in embodiment 1, wherein one of the storage media types is different from another of the storage media types.

Embodiment 3. The method as recited in embodiment 1, wherein the method is performed by a backup and restore application.

Embodiment 4. The method as recited in embodiment 1, wherein one of the storage media types is dedupe storage, and another of the storage media types is object storage.

Embodiment 5. The method as recited in embodiment 1, further comprising receiving information and using the information as a basis for classifying the files.

Embodiment 6. The method as recited in embodiment 1, wherein one of the files is relatively more compressible and/or dedupable than another of the files.

Embodiment 7. The method as recited in embodiment 1, wherein one of the storage media types is relatively less expensive for a customer to use than another of the storage media types.

Embodiment 8. The method as recited in embodiment 1, wherein the method is performed automatically by a backup and restore application, without requiring a user or other entity to classify the files, or to assign storage media types to the files.

Embodiment 9. The method as recited in embodiment 1, further comprising tracking the storage media where each of the files is stored at the storage site.

Embodiment 10. The method as recited in embodiment 1, wherein classification of the files is based in part on a customer service level agreement (SLA).

Embodiment 11. A method for performing any of the processes, or any portion thereof, disclosed herein.

Embodiment 12. A non-transitory storage medium having stored therein instructions that are executable by one or more hardware processors to perform the operations of any one or more of embodiments 1 through 11.

F. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media can be any available physical media that can be accessed by a general purpose or special purpose computer.

By way of example, and not limitation, such computer storage media can comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which can be used to store program code in the form of computer-executable instructions or data structures, which can be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' can refer to software objects or routines that execute on the computing system. The different components, modules, engines, and services described herein may be implemented as objects or processes that execute on the computing system, for example, as separate threads. While the system and methods described herein can be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention can be performed in client-server environments, whether network or local environments, or in any other suitable environment. Suitable operating environments for at least some embodiments of the invention include cloud computing environments where one or more of a client, server, or other machine may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
   receiving a plurality of files;
   creating a backup saveset that includes the plurality of files, wherein the backup saveset includes at least two types of files;
   identifying different classifications that each correspond to a respective file property;
   selecting a respective classification for each of the files;
   assigning the selected classifications to the files in the backup saveset, and a classification is not necessarily assigned according to a file type of a file;
   assigning a respective storage media type to each of the classified files in the backup saveset, and the storage media type is assigned to a given file based on the classification that has been assigned to that file, wherein one of the storage media types is dedupe storage and another of the storage media types is object storage; and
   transmitting the backup saveset, including the classified files, to a storage site.

2. The method as recited in claim 1, wherein the method is performed by a backup and restore application.

3. The method as recited in claim 1, wherein the file properties comprise any one or more of the following: file compressibility; file dedupability; and file type.

4. The method as recited in claim 1, further comprising information and using the information as a basis for classifying the files.

5. The method as recited in claim 1, wherein one of the files is relatively more compressible and/or dedupable than another of the files.

6. The method as recited in claim 1, wherein one of the storage media types is relatively less expensive for a customer to use than another of the storage media types.

7. The method as recited in claim 1, wherein the method is performed automatically by a backup and restore application, without requiring a user or other entity to classify the files, or to assign storage media types to the files.

8. The method as recited in claim 1, further comprising tracking the storage media where each of the files is stored at the storage site.

9. The method as recited in claim 1, wherein classification of the files is based in part on a customer service level agreement (SLA).

10. A non-transitory storage medium having stored therein instructions that are executable by one or more hardware processors to perform operations comprising:
    receiving a plurality of files;
    creating a backup saveset that includes the plurality of files, wherein the backup saveset includes at least two types of files;

identifying different classifications that each correspond to a respective file property;

selecting a respective classification for each of the files;

assigning the selected classifications to the files in the backup saveset, and a classification is not necessarily assigned according to a file type of a file;

assigning a respective storage media type to each of the classified files in the backup saveset, and the storage media type is assigned to a given file based on the classification that has been assigned to that file, wherein one of the storage media types is dedupe storage and another of the storage media types is object storage; and transmitting the backup saveset, including the classified files, to a storage site.

11. The non-transitory storage medium as recited in claim 10, wherein the operations are performed by a backup and restore application.

12. The non-transitory storage medium as recited in claim 10, wherein the file properties comprise any one or more of the following: file compressibility; file dedupability; and file type.

13. The non-transitory storage medium as recited in claim 10, wherein the operations further comprise receiving information and using the information as a basis for classifying the files.

14. The non-transitory storage medium as recited in claim 10, wherein one of the files is relatively more compressible and/or dedupable than another of the files.

15. The non-transitory storage medium as recited in claim 10, wherein one of the storage media types is relatively less expensive for a customer to use than another of the storage media types.

16. The non-transitory storage medium as recited in claim 10, wherein the operations are performed automatically by a backup and restore application, without requiring a user or other entity to classify the files, or to assign storage media types to the files.

17. The non-transitory storage medium as recited in claim 10, wherein the operations further comprise tracking the storage media where each of the files is stored at the storage site.

18. The non-transitory storage medium as recited in claim 10, wherein classification of the files is based in part on a customer service level agreement (SLA).

* * * * *